UNITED STATES PATENT OFFICE.

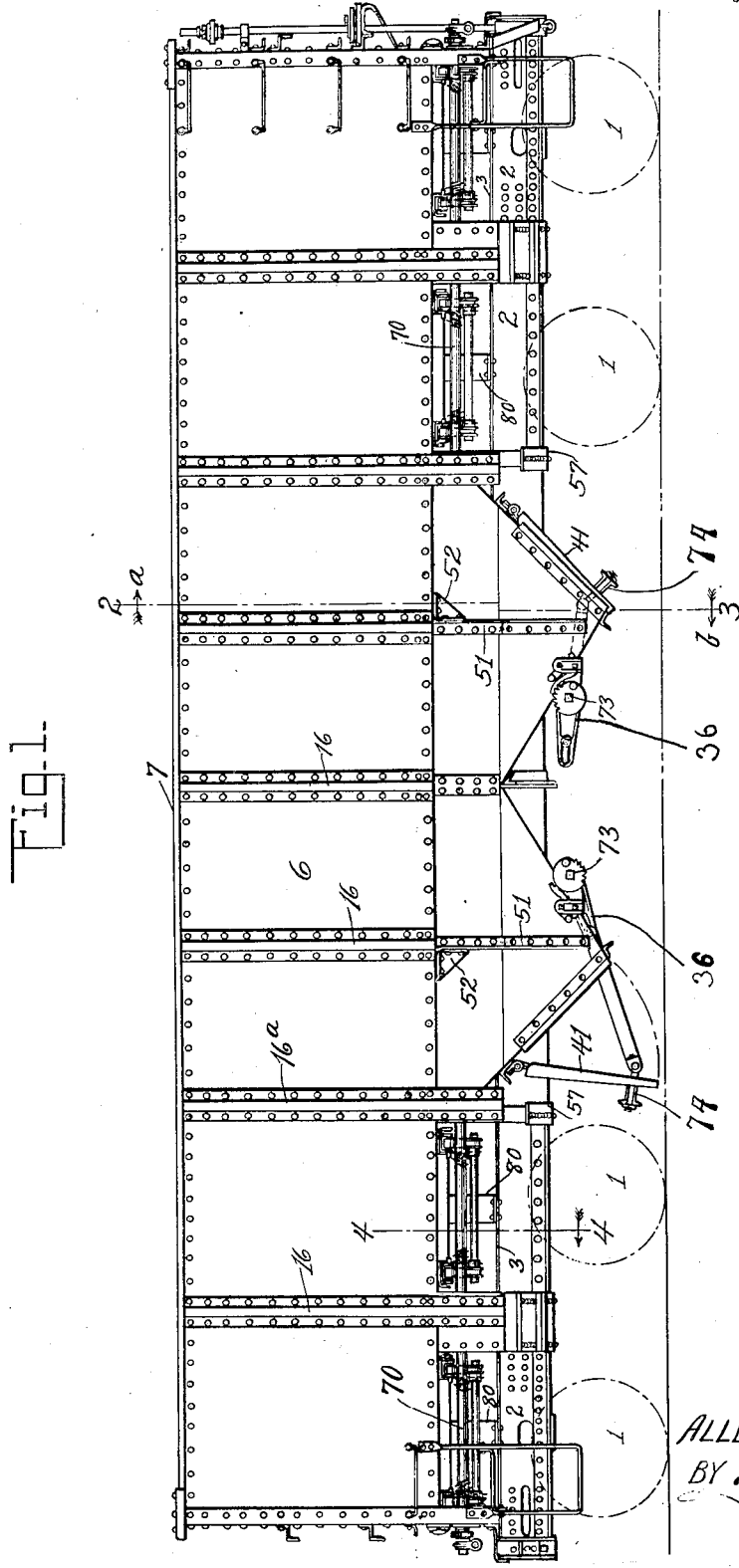

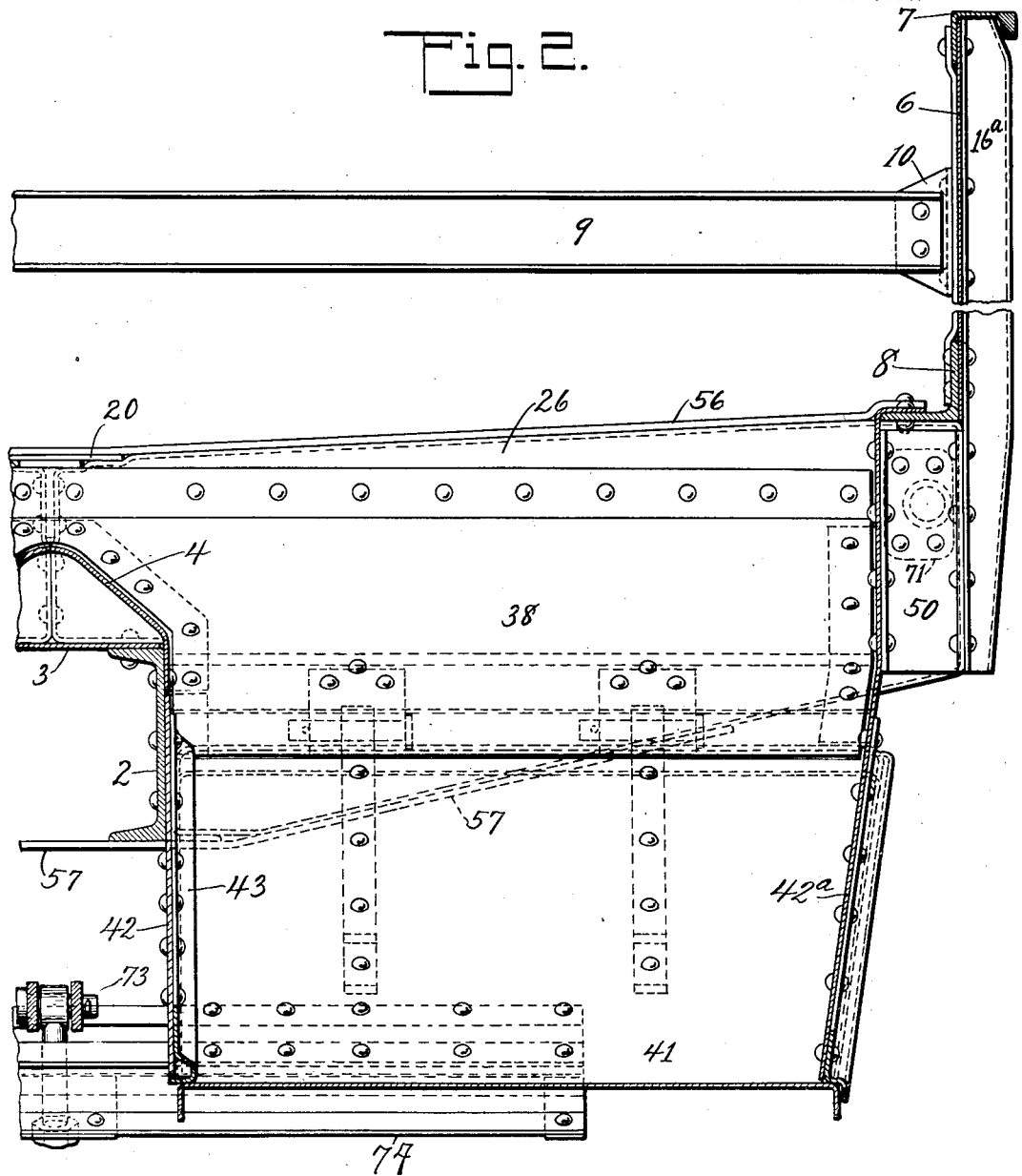

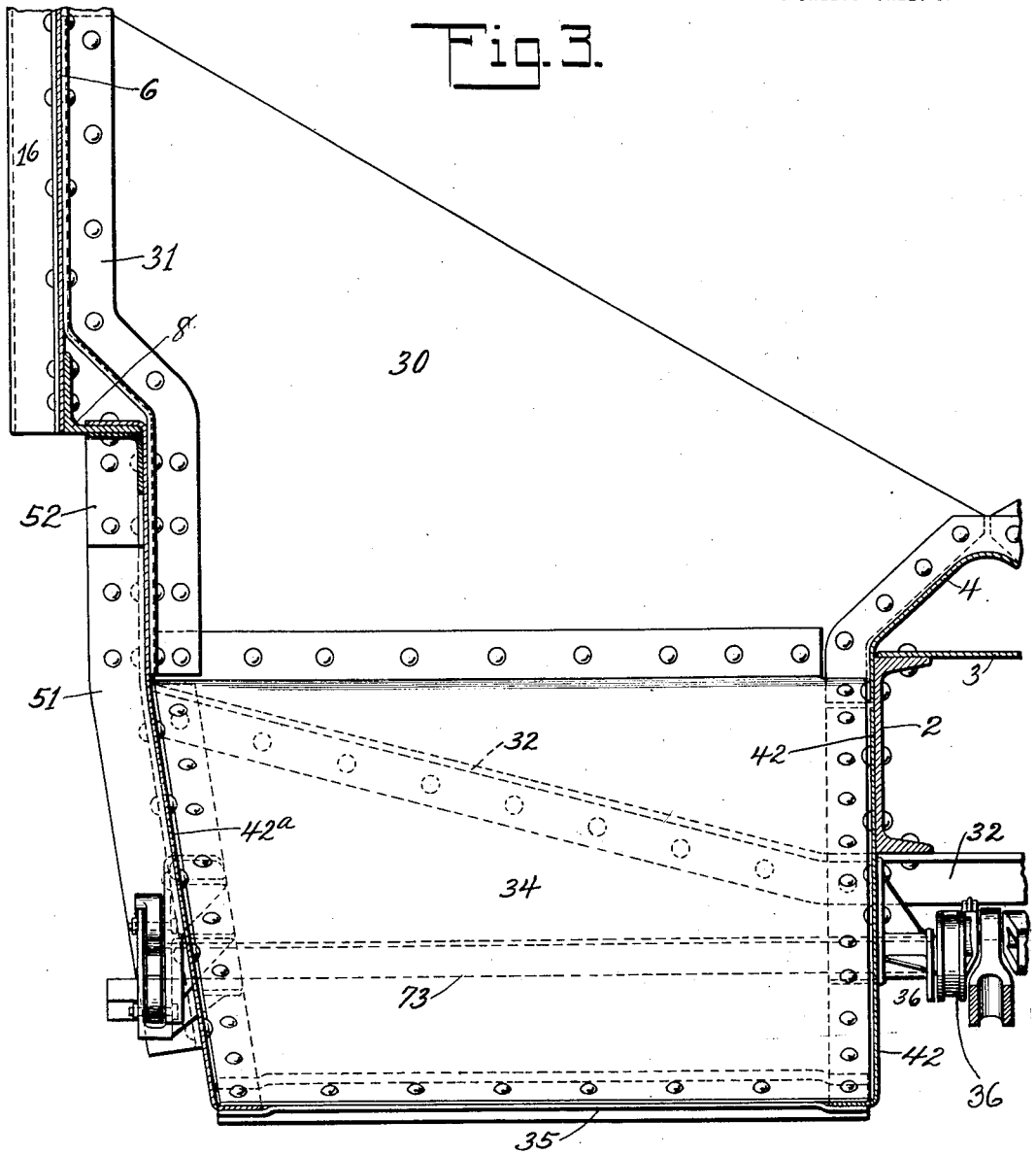

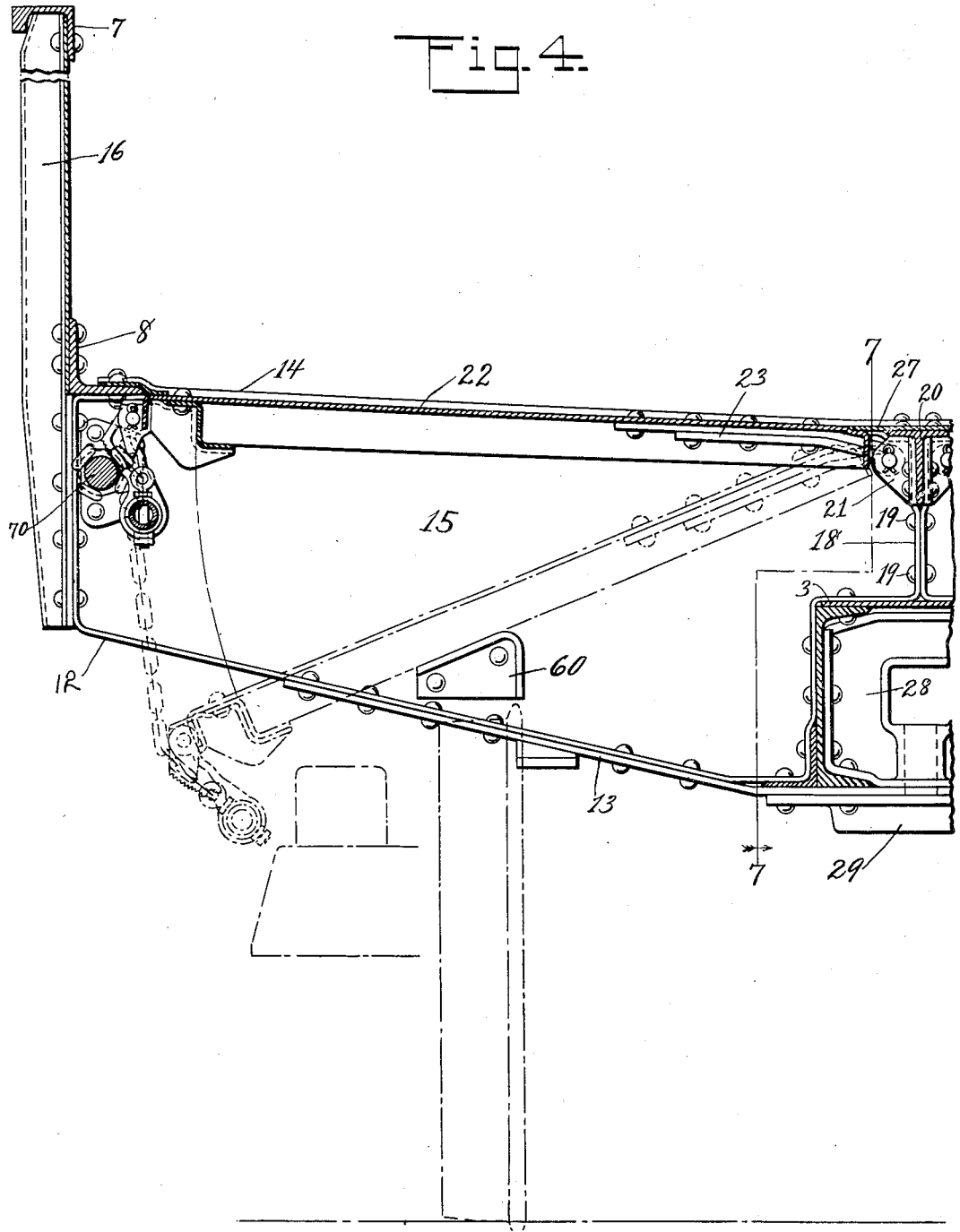

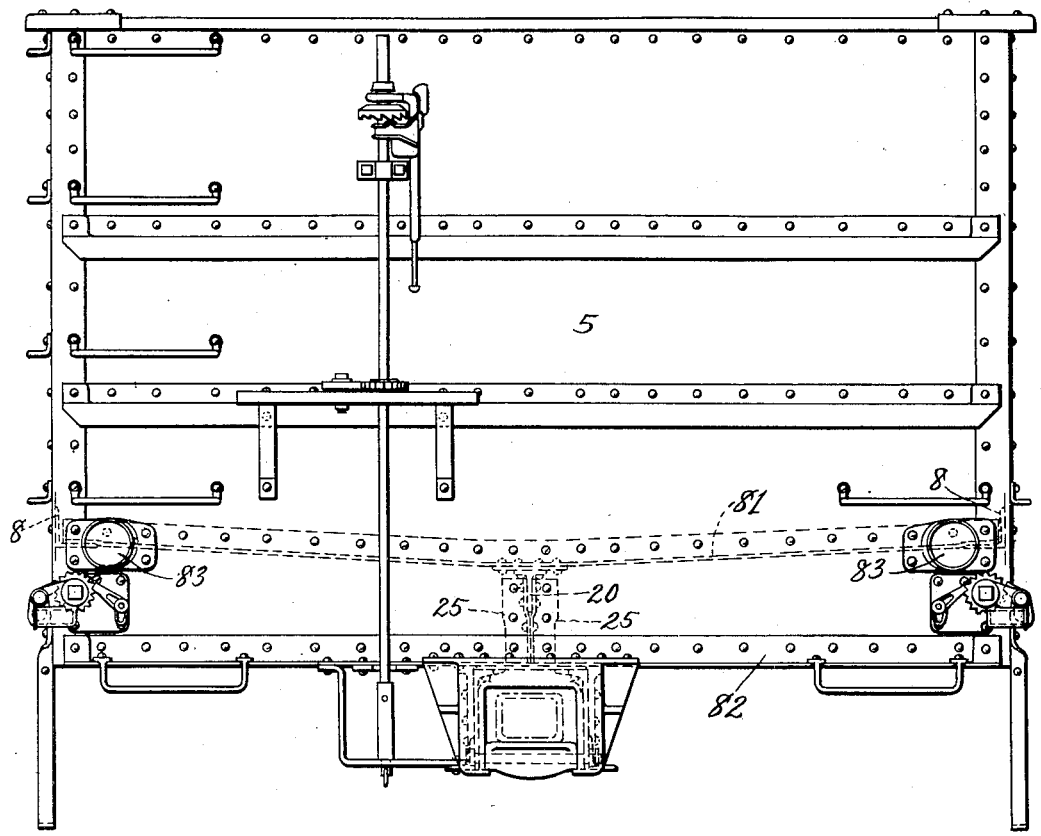

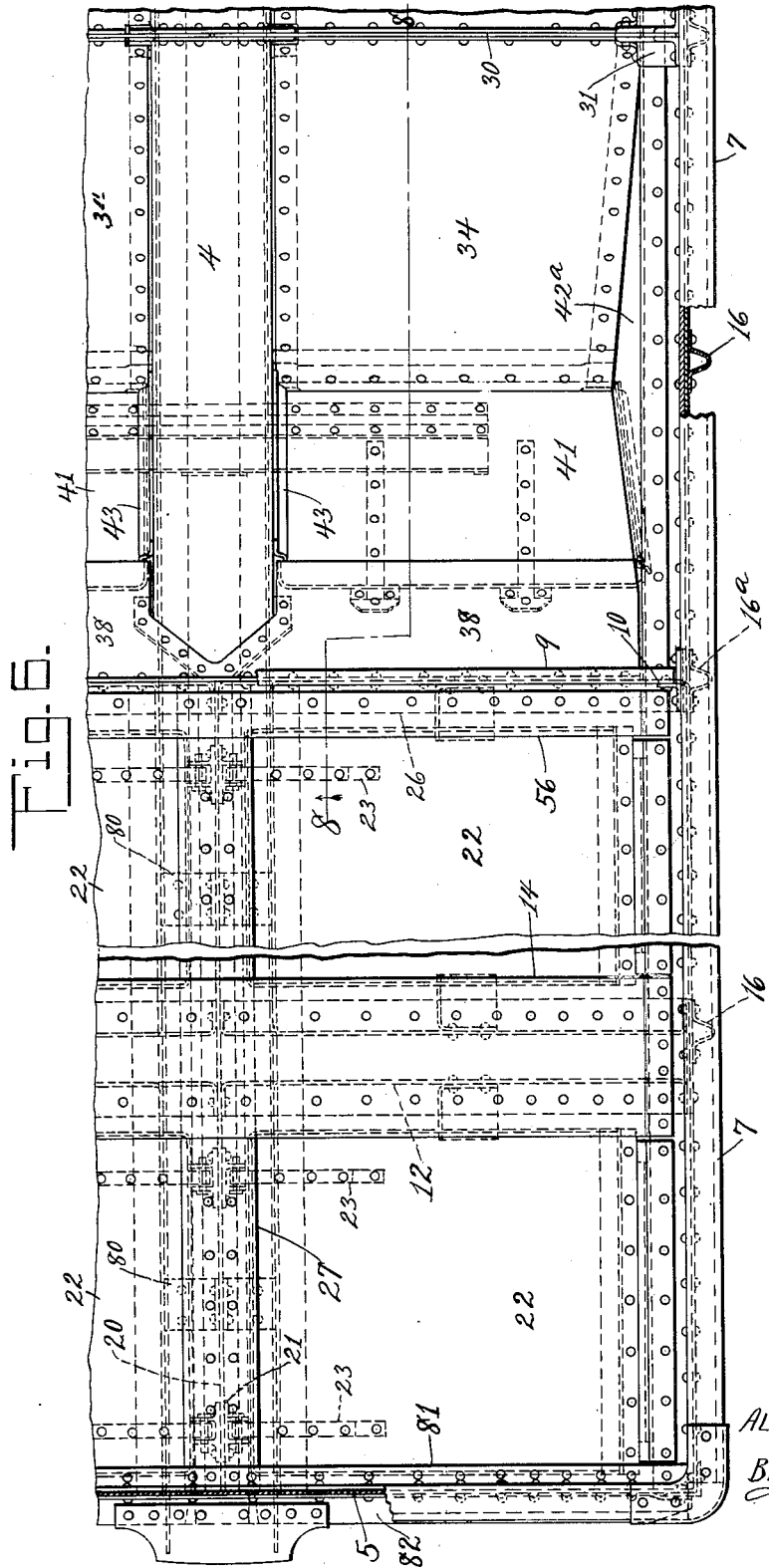

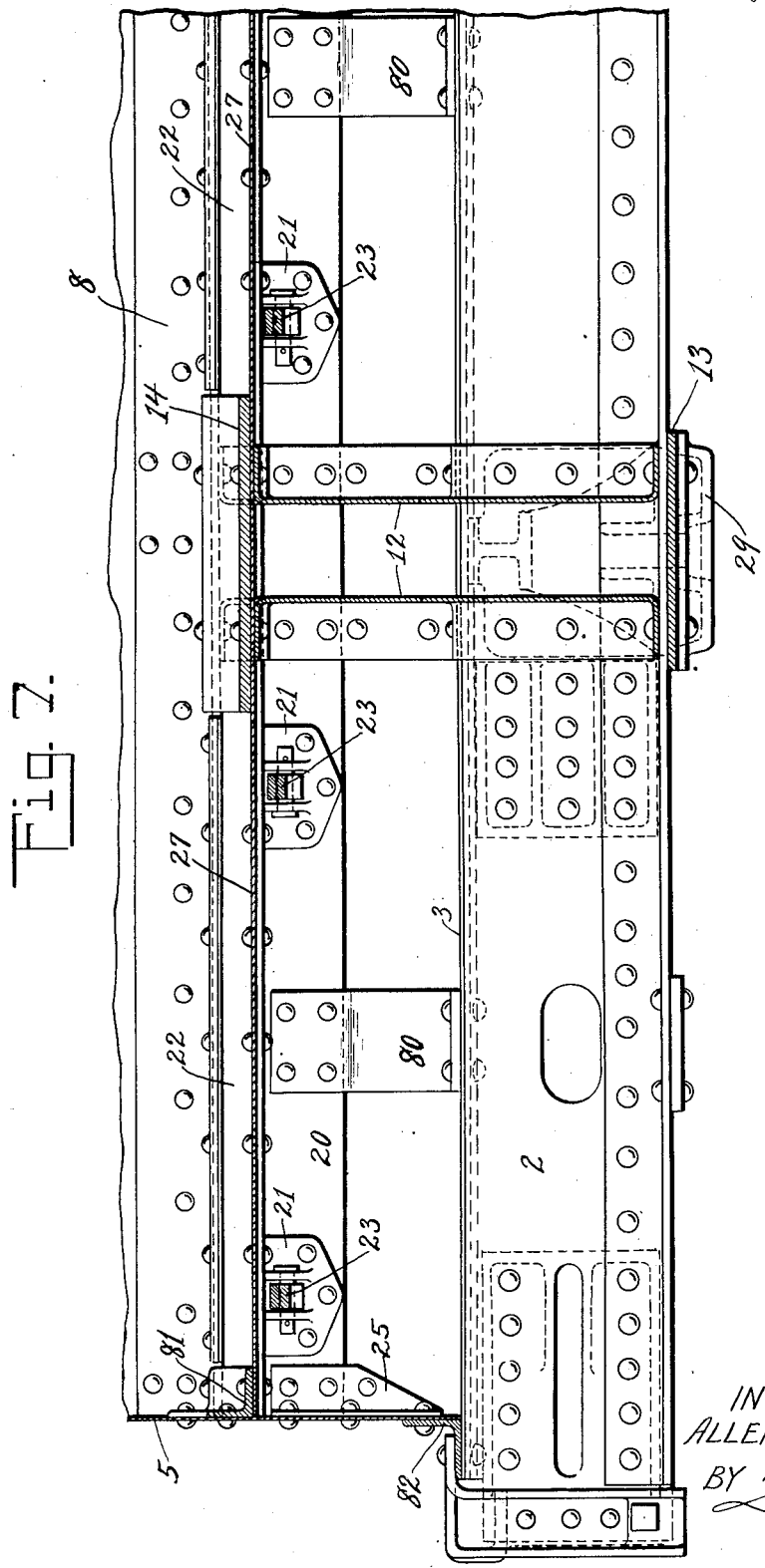

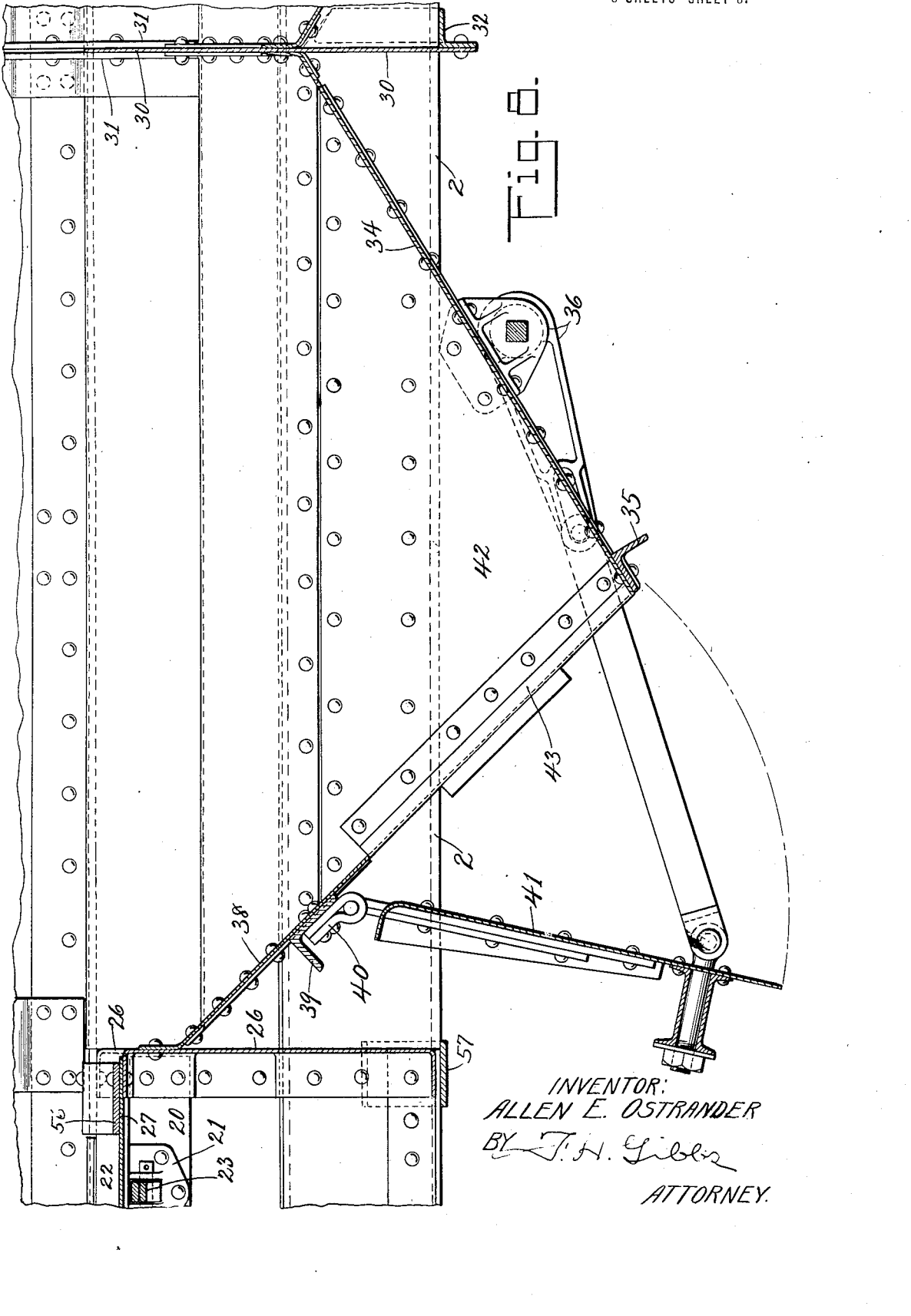

ALLEN E. OSTRANDER, OF RIDGEWOOD, NEW JERSEY, ASSIGNOR TO AMERICAN CAR AND FOUNDRY COMPANY, OF NEW YORK, N. Y., A CORPORATION OF NEW JERSEY.

DUMPING-CAR.

1,370,761.  Specification of Letters Patent.  Patented Mar. 8, 1921.

Application filed April 22, 1919. Serial No. 291,831.

*To all whom it may concern:*

Be it known that I, ALLEN E. OSTRANDER, residing at Ridgewood, Bergen county, New Jersey, and being a citizen of the United States, have invented certain new and useful Improvements in a Dumping-Car, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevational view of the car forming the subject matter of the present invention, showing in dotted lines the position of the wheels of a truck;

Fig. 2 is a transverse sectional view of a little more than half of the car, the section being taken as indicated by the arrow "*a*" at 2—3 of Fig. 1;

Fig. 3 is a similar view, the section being taken along the same line, but looking in the direction indicated by the arrow "*b*";

Fig. 4 is an enlarged sectional view partly broken away, the section being taken on line 4—4 of Fig. 1 looking in the direction indicated by the arrow;

Fig. 5 is an end elevational view;

Fig. 6 is a plan view of one portion of the car extending from an end sill and the side wall partway beyond the middle of the car and beyond the center sill;

Fig. 7 is a longitudinal sectional view of an end portion of the car with the upper portion of the side wall broken away, the section being taken on line 7—7 of Fig. 4, looking in the direction indicated by the arrow;

Fig. 8 is a longitudinal sectional view, the section being taken approximately on line 8—8 of Fig. 6.

The object of the invention is to produce a maximum capacity car available for general service in hauling articles of considerable length and possessing the advantage of being adapted for use in carrying granular material, coal, etc., which can be dumped in the pockets now provided.

In the coal service and more especially in the anthracite region, it is common practice to run coal cars on trestles over coal pockets and dump the coal through bottom doors into such pockets. This practice resulted in the development of the self-clearing type of hopper car, known as center dump cars, designed to discharge all of its lading centrally of the car and between the rails. On western roads a type of gondola car with bottom doors, known as outwardly dumping doors, adapted to discharge lading outwardly and away from the rails, has been developed. These outwardly dumping doors extend, in some instances, the entire length of the car body and as the cars are frequently much longer than the pockets, such cars are not commonly available for use in the anthracite region where the lading is to be dumped outwardly unless a tipple is employed or but a portion of the lading is dumped at a time.

To produce a maximum capacity car which will possess the advantages of the gondola car and the self-clearing hopper is the object of the present invention, which contemplates the employment of outwardly dumping doors over the trucks of the car and center dumping doors to discharge the lading from the middle portion of the car, which middle portion extends downwardly below the plane of the bottom of the car over the truck portions, thereby greatly increasing the carrying capacity of the car. With that object in view and to overcome difficulties inherent in cars of the gondola type with outwardly dumping doors extending throughout the length thereof, the present invention provides a car body of maximum capacity which can be dumped into the pockets commonly provided in the anthracite region, while possessing the advantages of that type of car employing outwardly dumping doors throughout its length.

To effect this desirable result, outwardly dumping doors are provided in that portion of the car body over the trucks and center dumping doors in that portion of the car body intermediate the trucks, which doors are operated, respectively, by a plurality of longitudinally extending operating shafts and a transverse shaft at each side of the middle of the length of the car body so that approximately one-half of the lading may be dumped into a single pocket at one time, after which the car may be again "spotted" and the remaining portion of the lading discharged into said pocket. Associated with the longitudinal and transverse shafts are door-operating devices hereinafter more specifically referred to.

Referring to the parts, 1 indicates the wheels of the truck, 2 the center sills, which preferably extend throughout the entire length of the car body, though this is not absolutely essential to the invention, but where employed in the middle portion of the car the sills are united by top cover plate 3 and covered by the conventional shedding crown 4, which may be of any type of construction preferred and preferably the center sills extend beyond the end wall 5, as best shown in Fig. 7. The principal side wall 6 is of plate girder construction provided with a top chord 7 which is shown in section in Fig. 2 and is of the shape in cross section which has been found best adapted for application to cars which are sometimes dumped on the tipples in which the entire load of the car is dumped at one time. The bottom chord 8 is preferably angle-shape in cross section and the side walls are connected and tied together by the usual cross tie channel 9, connected with the side walls 6 by means of the knee braces 10, one of which is shown in Fig. 2.

A bolster 12, shown in dotted lines in Fig. 6, in elevation in Fig. 4 and in section in Fig. 7, is built up and comprises the conventional bottom plate 13, top plate 14 and the diaphragms 15, which latter are of peculiar construction, being formed from a pressed plate deeper in the vicinity of the center sills than at the outer ends where said diaphragms are connected to the side stakes 16. Bolster diaphragms incline upwardly and outwardly from the longitudinal center line of the car, as shown in Fig. 4, and are provided with the flanges 18 through which said diaphragms are connected by means of the rivets 19 and between the meeting faces of the adjacent bolster diaphragms there are interposed heavy T-sections 20 extending above the center sill from each end of the shedding crown or ridge 4 to the adjacent car end, to which the door-operating brackets 21 are riveted, as shown in Fig. 7, and upon these brackets the doors 22 are supported by the usual strap hinges 23 or other equivalent supporting means. The T-section extends through the bolster, as shown in Figs. 4, 6 and 7, from the end wall 5 to which it is connected by means of the knee braces 25 to the cross bearer 26 at each end of the car and terminates preferably at such cross bearers, as shown in Fig. 8, and the diaphragms of the cross bearers are pocketed, as are the diaphragms of the bolsters, to accommodate therebetween the depending vertical leg of the T-section 20, through which depending leg and the outstanding flanges of the cross bearer diaphragms and the diaphragms of the bolsters, rivets extend to form a rigid structure.

The bolster being of the depth best indicated in Fig. 4 permits placing the hinges of the doors 22 at such an altitude that when the doors are dropped to dump that portion of the lading over the trucks, such doors will have a considerable drop as indicated in Fig. 4, thereby providing a maximum discharge opening for lading above the trucks, and as the floor plate 27, which extends longitudinally from the end wall to the cross bearer 26, is relatively narrow, approximately the entire load above the trucks can be dumped through the outwardly dumping doors there provided.

The usual bolster center filler casting 28 and center bearing plate 29 are employed, as shown in Fig. 4.

Intermediate the cross bearers 26, twin hoppers are provided, one pair adjacent each set of cross bearers 26 extending to the middle of the car, as shown in Fig. 8. At the middle of the length of the car, tie plates 30 extend from the side wall 6 inwardly and to the center sill and serve the double function of reinforcing the body of the car and assist somewhat in dividing the lading when it is desired to dump such lading from either end portion of the car. These plates 30 are connected to the side walls by means of the angles 31 riveted to the side walls and extending downwardly within the car body nearly to the bottom of such plates. Along the bottom edge portion of the plates, stiffening angle 32 is secured which stiffening angle extends, as shown in Fig 3, transversely across the car, is connected to the bottom flanges of the center sills 2 and serves as a cross tie in the car body construction.

Extending obliquely downwardly and longitudinally of the car from the plates 30, are the fixed hopper slope sheets 34 reinforced by the angles 35 extending transversely thereunder and to the fixed hopper slope sheets are secured the hopper door-operating devices indicated generally by the reference character 36.

The opposite ends of the hoppers, that is the ends nearer the trucks, are formed in part by the cross bearers 26 and the relatively narrow fixed slope sheets 38 along the bottom edge portion of which fixed slope sheets are secured reinforcing angles 39 to which the door hinge butts 40 of the inclined hopper doors 41 are secured, so that the door side of the hoppers is formed in part, each, of the cross bearers, narrow fixed slope sheets and the doors, and as the four doors of the twin hoppers on each side of the center sills are of substantially identical construction, description of one will answer for all. The side hopper sheets 42 on the inner sides of the hoppers are riveted to and depend below the sill 2, as shown in Figs. 2 and 3, and there is secured to these sheets the conventional door stops, or door strips, 43 shown partly in elevation and partly in section in Fig. 2. The outer side hopper sheet 42ª overlaps the lower chord 8 of the side plate girder, as shown in Figs. 2 and 3, and is connected therewith by suitable rivet connection, extending thence downwardly for part of its depth parallel with the fillers 50 interposed between the side stake extensions and outer side hopper sheets, as shown in Fig. 2. Intermediate the length of said side hopper sheets, other extensions of the stakes comprise angles 51, see Fig. 3, which are connected with the bottom chord 8 by means of the knee brackets 52 for the purpose of stiffening and supporting said side hopper sheets.

The cross bearers 26 are provided with top and bottom cover plates 56 and 57, respectively, for well understood purposes, and the top cover plate is of greater width than the top flange of the cross bearer to which it is secured so as to afford a stop for the outwardly dumping door next adjacent to such cross bearers, and, as is common in this type of car door, stops 60 are secured to the bolster diaphragms and the cross bearer diaphragms to limit the opening movement of the doors.

The door-operating mechanism comprises a plurality of longitudinally extending operating shafts at each end of the car and a single transversely extending shaft at each side of the longitudinal center of the car, and these shafts may be connected to synchronize the operation of all of the doors, if desired, but as the mechanism for accomplishing this forms no part of the present invention, it is not here illustrated.

In the structure illustrated, the shafts 70 extend longitudinally through the end wall of the car to the side stakes 16ª, past the side stakes 16 and upon the filler 50 there are secured door shaft brackets 71 to receive the inner ends of the shafts 70.

Suitable winding chains and door-locking means are best shown in connection with the shafts 70, are provided for lifting the outwardly dumping doors over the trucks, and connected with the shafts 73, are suitable door-operating devices, indicated generally by the reference character 36, which are connected to the bars 74 extending across the car beneath the doors of both hoppers and are connected thereto so as to operate the doors together, the inclined hopper door 41 being shown in open position with relation to the hopper at the left-hand side of the center of the car, Fig. 1, and in closed position at the right-hand side hopper of that figure.

As it is desirable, as hereinbefore indicated, to provide the maximum opening for the outwardly dumping doors above the trucks, the door-supporting T-section 20 is carried at some distance above the upper level of the channels 2 of the center sills, and said T-section is supported at one end by the end wall, at the opposite end by the adjacent cross bearer and intermediate its ends by the bolster and between the bolster and end wall and between the bolster and adjacent cross bearer additional supporting brackets 80 are provided, as best shown in Fig. 7, which brackets rest upon the center sills, extend thence upwardly and lap, and are securely riveted to, the depending leg of the T-section 20, thereby providing additional supporting means therefor within the zone of the outwardly dumping doors.

As shown in Figs. 4, 5 and 7, the outwardly dumping doors incline upwardly and outwardly from the longitudinal center of the car above the trucks, thereby providing an incavated bottom portion with dumping doors above the trucks.

The end wall of the car is reinforced by means of the angle 81, shown in dotted lines in Fig. 5 and in section in Fig. 7, which angle extends, as shown by dotted lines in Fig. 5, upwardly and outwardly from the region of the center sills to and above the tension chord 8 of the side plate girder, above which it is crimped, as shown in dotted lines in Fig. 5, and to which it is riveted, while along the bottom edge of the end wall is another reinforcing angle 82 which is riveted to the center sills, as shown in Figs. 5 and 7. The push-pole pockets 83 are positioned within the zone of the reinforcement formed by the bottom chord 8 and the transversely extending angle 81, as best shown in Fig. 5, thereby providing the necessary rigidity when the push-pole pocket is used in poling the car.

Other details of construction, conventional in cars of this general type, are shown but are not described in detail as they form no part of the present invention, which is designed to provide a maximum capacity car body which will be self-clearing and which, due to arrangement of the parts, will be unusually rugged and adapted for rough service conditions.

It will be observed that when functioning as doors the outwardly dumping doors are all obliquely disposed and the center dump doors are in lower planes than the others, that the center of gravity of the load is low and the door-openings, when the doors are in open position, are large enough to permit quick discharge of all lading.

What I claim is:

1. In a dumping car, a pair of side and end walls and door openings occupying the greater portion of the space between said walls, doors hinged longitudinally of the car within each end portion thereof and intermediate doors adjacent said first mentioned doors closing on transversely disposed hinges and being adapted to direct the lading in the general direction of said first mentioned doors.

2. In a dumping car, a pair of side and end walls and door openings occupying the greater portion of the space between said walls, doors hinged longitudinally of the car within each end portion thereof and intermediate doors adjacent said first mentioned doors closing in a lower plane on transversely disposed hinges and being adapted to direct the lading in the general direction of said first mentioned doors.

3. In a dumping car, a center sill, a pair of side and end walls and door openings occupying the greater portion of the space between said walls, doors hinged longitudinally of the car within each end portion thereof and intermediate doors adjacent said first mentioned doors closing in a plane below said center sill on transversely disposed hinges and being adapted to direct the lading in the general direction of said first mentioned doors.

4. In a dumping car having vertical side and end walls, door openings occupying the greater portion of the space between said walls, doors hinged longitudinally of the car, side hopper sheets and transversely hinged doors between said hopper sheets and wholly below the first mentioned doors when both are closed.

5. In a dumping car, side and end walls, door openings occupying the major portion of the space between said walls, side-dumping end doors and a pair of spaced intermediate hoppers and obliquely disposed doors therefor, each hopper being adapted to discharge its lading in the direction of the adjacent end doors.

6. In a center and side dumping car, the combination of an underframe having a center sill, side and end walls, a dumping bottom portion formed with central longitudinal and transverse ridges with side dumping doors hinged over said center sill and beyond said longitudinal ridge at each end and transversely hinged doors opening in opposite directions intermediate said side dumping doors.

7. In a dumping car, end walls and plate girder side walls, a center sill, longitudinally extending side hopper sheets depending from and below said side walls and center sill, inclined hopper doors and side dumping doors in a higher plane within each end portion of the car and extending over said center sill.

8. In a dumping car having outwardly dumping doors over the trucks and a plurality of hoppers at each side of its middle and obliquely disposed doors adapted each to open in the direction of the nearer end of the car.

9. In a dumping car, a center sill, an incavated bottom in the car end portions comprising side dumping doors supported above said center sill, inclined hoppers intermediate the end portions and inclined hopper doors adapted to open and permit discharge of lading toward the adjacent end portion.

10. In a dumping car, a center sill, a plurality of sets of doors, one set supported above the center sill over the trucks of the car and another set supported between said trucks, both sets being inclined when in closed position and hung on hinges angularly disposed with relation to each other.

11. In a dumping car, a center sill, a plurality of sets of doors adapted to close spaced openings, one set supported above the center sill over the trucks of the car and another set supported between said trucks, both sets being inclined when in closed position and hung on hinges angularly disposed with relation to each other.

12. In a dumping car, a center sill, a plurality of outwardly dumping doors supported above said center sill over each truck and inclined doors intermediate the trucks hung on hinges extending transversely of the car.

13. In a dumping car having a longitudinally extending lading shedding ridge, a plurality of doors hinged above said ridge and disposed between said ridge and the car ends and transversely disposed doors below said ridge.

14. In a dumping car, a center sill, a longitudinal shedding ridge, doors at each side thereof opening toward the ends of the car, members extending from said ridge above said center sill and outwardly dumping doors hinged to said members.

15. In a dumping car, a longitudinally extending shedding ridge, transversely extending doors extending below the plane of said ridge and outwardly dumping doors occupying, when closed, a plane higher than said ridge.

16. In a dumping car, a center sill, twin hoppers on each side of said center sill, doors therefor, means extending transversely below said center sill connecting said doors in pairs, a transverse shaft, door-operating means operable from said shaft, doors hung on hinges extending longitudinally of the car over said center sill and door-operating means therefor.

17. In a dumping car, a pair of side and end walls and door openings occupying the greater portion of the space between said walls, doors hinged longitudinally of the car within each end portion thereof and inclining upwardly and outwardly from the hinges toward the car side, and intermediate doors closing on transversely disposed hinges and being in a lower plane than said first mentioned doors and adapted to direct the lading in the general direction of said first mentioned doors.

18. In a dumping car, a center sill, a pair of side and end walls and door openings occupying the greater portion of the space between said walls, doors hinged over said center sill on hinges extending longitudinally of the car within each end portion thereof, and transversely extending pairs of inclined intermediate doors closing in a lower plane on transversely disposed hinges and being adapted to open and permit discharge of the lading in the general direction of said first mentioned doors.

19. In a dumping car, a center sill, a pair of side and end walls and door openings occupying the greater portion of the space between said walls, doors hinged longitudinally of the car above said center sill and within each end portion of the car, and intermediate transversely extending inclined doors closing in a plane below said first mentioned doors and adapted to open to permit discharge of the lading in the general direction of said first mentioned doors.

20. In a dumping car having vertical side and end walls, and having door openings occupying the greater portion of the space between said walls, doors hinged longitudinally of the car and inclined upwardly from the hinges toward the sides thereof, inner and outer side hopper sheets and pairs of connected transversely hinged doors between said hopper sheets and wholly below the first mentioned doors when both are closed.

21. In a dumping car, a center sill, bolster sections secured to said sill and to each other, a member secured between said sections and doors hinged to said member.

22. In a dumping car, a center sill, bolster and cross bearer sections secured to said center sill and to each other and extending above said sill, a member secured between said bolster and cross bearer sections and outwardly dumping doors hinged to said member.

In witness whereof I have hereunto set my hand in the presence of two witnesses.

ALLEN E. OSTRANDER.

Witnesses:
HOWARD C. LUNGER,
OSCAR HOCHBERG.